(12) United States Patent
Todd

(10) Patent No.: US 10,941,825 B2
(45) Date of Patent: Mar. 9, 2021

(54) MULTIPLE LAYER PISTON INSULATOR FOR HYDRAULIC BRAKE ACTUATOR

(71) Applicant: GOODRICH CORPORATION, Charlotte, NC (US)

(72) Inventor: Timothy Kyle Todd, Lebanon, OH (US)

(73) Assignee: Goodrich Corporation, Charlotte, NC (US)

( * ) Notice: Subject to any disclaimer, the term of this patent is extended or adjusted under 35 U.S.C. 154(b) by 99 days.

(21) Appl. No.: 16/384,567

(22) Filed: Apr. 15, 2019

(65) Prior Publication Data

US 2020/0325948 A1 Oct. 15, 2020

(51) Int. Cl.

| | |
|---|---|
| *F16D 65/18* | (2006.01) |
| *F16D 55/40* | (2006.01) |
| *F16J 1/01* | (2006.01) |
| *B64C 25/44* | (2006.01) |
| *B32B 9/04* | (2006.01) |
| *B60B 27/00* | (2006.01) |
| *B64C 25/34* | (2006.01) |
| *F16J 1/00* | (2006.01) |
| *F16D 121/04* | (2012.01) |
| *F16D 125/06* | (2012.01) |

(52) U.S. Cl.
CPC .............. *F16D 65/18* (2013.01); *B32B 9/041* (2013.01); *B60B 27/0052* (2013.01); *B64C 25/34* (2013.01); *B64C 25/44* (2013.01); *F16D 55/40* (2013.01); *F16J 1/006* (2013.01); *F16J 1/01* (2013.01); *B32B 2605/18* (2013.01); *F16D 2121/04* (2013.01); *F16D 2125/06* (2013.01); *F16D 2250/0084* (2013.01)

(58) Field of Classification Search
CPC .......... F16D 55/02; F16D 55/24; F16D 55/36; F16D 55/40; F16D 2055/0004; F16D 65/0006; F16D 65/005; F16D 65/0971; F16D 65/0979; F16D 65/18; F16D 2125/06; F16D 2250/0084; F16D 2065/785; F16J 1/01; F16J 1/006
USPC ..................... 188/73.37, 250 R, 250 E, 250 F
See application file for complete search history.

(56) References Cited

U.S. PATENT DOCUMENTS

| 4,147,241 A | 4/1979 | Preniczny et al. |
| 4,506,768 A * | 3/1985 | Innocent ................. F16D 65/18 |
| | | 188/370 |

(Continued)

FOREIGN PATENT DOCUMENTS

| DE | 202010009547 | 9/2010 | |
| JP | 59029828 A * | 2/1984 | ............. F16D 65/02 |

(Continued)

OTHER PUBLICATIONS

European Patent Office, European Search Report dated Jun. 22, 2020 in Application No. 19213946.7.

*Primary Examiner* — Thomas J Williams
(74) *Attorney, Agent, or Firm* — Snell & Wilmer L.L.P.

(57) ABSTRACT

A multilayer piston insulator may comprise a plurality of axially aligned disks of a disk stack comprising, a first disk, a second disk, and a third disk, wherein the second disk is coupled axially between the first disk and the third disk and comprises a different material than the third disk, and wherein the disk stack is configured to couple to a hydraulic piston.

14 Claims, 6 Drawing Sheets

(56) References Cited

U.S. PATENT DOCUMENTS

| | | | | |
|---|---|---|---|---|
| 4,513,844 | A | * | 4/1985 | Hoffman, Jr. ....... F16D 65/0006 |
| | | | | 188/264 G |
| 4,537,289 | A | * | 8/1985 | VonGrunberg ..... F16D 65/0979 |
| | | | | 188/264 G |
| 4,596,317 | A | * | 6/1986 | Nagai ................ F16D 65/0971 |
| | | | | 188/250 G |
| 4,603,760 | A | * | 8/1986 | Myers ................... F16D 65/092 |
| | | | | 188/73.37 |
| 4,848,291 | A | * | 7/1989 | Kawamura ............. F02B 77/11 |
| | | | | 123/193.6 |
| 5,205,382 | A | * | 4/1993 | Edmisten ................ B64C 25/42 |
| | | | | 188/196 R |
| 5,538,109 | A | * | 7/1996 | Swank .................... F16D 55/40 |
| | | | | 188/264 G |
| 5,608,967 | A | | 3/1997 | Swank |
| 5,988,044 | A | * | 11/1999 | Meyer ........................ F16J 1/01 |
| | | | | 188/264 G |
| 2004/0094375 | A1 | | 5/2004 | Qian et al. |
| 2008/0035434 | A1 | * | 2/2008 | Denys .................... F16D 69/04 |
| | | | | 188/73.37 |
| 2010/0133050 | A1 | * | 6/2010 | Arbesman ........... F16D 65/0971 |
| | | | | 188/73.35 |
| 2012/0111677 | A1 | * | 5/2012 | Fracasso ............. F16D 65/0971 |
| | | | | 188/325 |
| 2018/0010659 | A1 | * | 1/2018 | Kuridza .................. F16D 65/18 |
| 2020/0049216 | A1 | * | 2/2020 | Herrmann ............... F16D 55/36 |
| 2020/0325948 | A1 | * | 10/2020 | Todd ....................... F16D 55/40 |

FOREIGN PATENT DOCUMENTS

| | | | | |
|---|---|---|---|---|
| JP | 10037990 | A | * 2/1998 | ......... F16D 65/0006 |
| WO | 02099305 | | 12/2002 | |
| WO | WO-2004013511 | A1 | * 2/2004 | ............. F16D 65/18 |

* cited by examiner

MULTIPLE LAYER PISTON INSULATOR FOR HYDRAULIC BRAKE ACTUATOR

FIELD

The disclosure relates generally to aircraft brake systems and aircraft brake actuation systems.

BACKGROUND

Aircraft often include one or more landing gear that comprise one or more wheels. A braking system may typically be coupled to the wheel(s) in order to decelerate or park the aircraft. Aircraft braking may induce heating in hydraulic system components which tend to elevate hydraulic fluid temperatures. Elevated hydraulic fluid temperatures tend to promote hydraulic fluid seal degradation and fluid leakage, thereby decreasing system reliability and performance.

SUMMARY

In various embodiments the present disclosure provides a multilayer piston insulator comprising a plurality of axially aligned disks of a disk stack including at least, a first disk, a second disk, and a third disk, wherein the second disk is coupled relatively between the first disk and the third disk and configured to inhibit conductive heat transfer between the first disk and the third disk, and wherein the disk stack is configured to couple to a hydraulic piston.

In various embodiments, the first disk comprises a carbon material. In various embodiments, at least one of the second disk or the third disk comprises one of a steel, a stainless steel, a tungsten carbide, a titanium, a titanium alloy, a nickel, nickel alloy, a nickel steel, a silicate, or a ceramic. In various embodiments, the second disk comprises a first annulus and the third disk comprises a second annulus. In various embodiments, the first annulus has a diameter relatively lesser than that of the second annulus. In various embodiments, the second disk comprises a first circumferential wall extending perpendicular to the second disk proximate an outer diameter of the second disk defining a disk cup. In various embodiments, the first disk is disposed within the disk cup defined by the first circumferential wall. In various embodiments, the third disk comprises a second circumferential wall extending perpendicular to the third disk proximate an outer diameter of the third disk, wherein the second circumferential wall is defined by a coupling portion of the second disk. In various embodiments, the third disk comprises an annular extrusion perpendicular to the disk about the second annulus, wherein the annular extrusion comprises a retaining ring channel. In various embodiments, each of the plurality of axially aligned disks are coupled by a retaining band applied circumferentially about the disk stack.

In various embodiments the present disclosure provides a brake assembly for mounting on an axle comprising a brake friction stack, a wheel comprising a hub coupled to the axle, a torque bar configured to engage with the wheel and rotate the brake rotor, and an actuator assembly configured to apply brake pressure to the brake friction stack including a multilayer piston insulator, comprising a plurality of axially aligned disks of a disk stack including at least, a first disk, a second disk, and a third disk, wherein the second disk is coupled relatively between the first disk and the third disk and configured to inhibit conductive heat transfer between the first disk and the third disk, and wherein the disk stack is configured to couple to a hydraulic piston.

In various embodiments, each of the plurality of axially aligned disks are coupled by a retaining band applied circumferentially about the disk stack. In various embodiments, the first disk comprises a carbon material and at least one of the second disk or the third disk comprises one of a steel, a stainless steel, a tungsten carbide, a titanium, a titanium alloy, a nickel, nickel alloy, a nickel steel, a silicate, or a ceramic. In various embodiments, the second disk comprises a first annulus and the third disk comprises a second annulus. In various embodiments, the first annulus has a diameter relatively lesser than that of the second annulus. In various embodiments, the second disk comprises a first circumferential wall extending perpendicular to the second disk proximate an outer diameter of the second disk defining a disk cup. In various embodiments, the first disk is disposed within the disk cup defined by the first circumferential wall. In various embodiments, the third disk comprises a second circumferential wall extending perpendicular to the third disk proximate an outer diameter of the third disk, wherein the second circumferential wall is defined by a coupling portion of the second disk. In various embodiments, the third disk comprises an annular extrusion perpendicular to the disk about the second annulus, wherein the annular extrusion comprises a retaining ring channel.

In various embodiments, the present disclosure provides a method of manufacturing a multilayer piston insulator comprising disposing a first disk of a carbon material within a disk cup of a second disk, coupling the second disk to a third disk at a coupling portion of the second disk, axially aligning each of the first disk, the second disk, and the third disk in response to the coupling, and applying a retaining band circumferentially about each of the first disk, the second disk, and the third disk to form a disk stack.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1A:
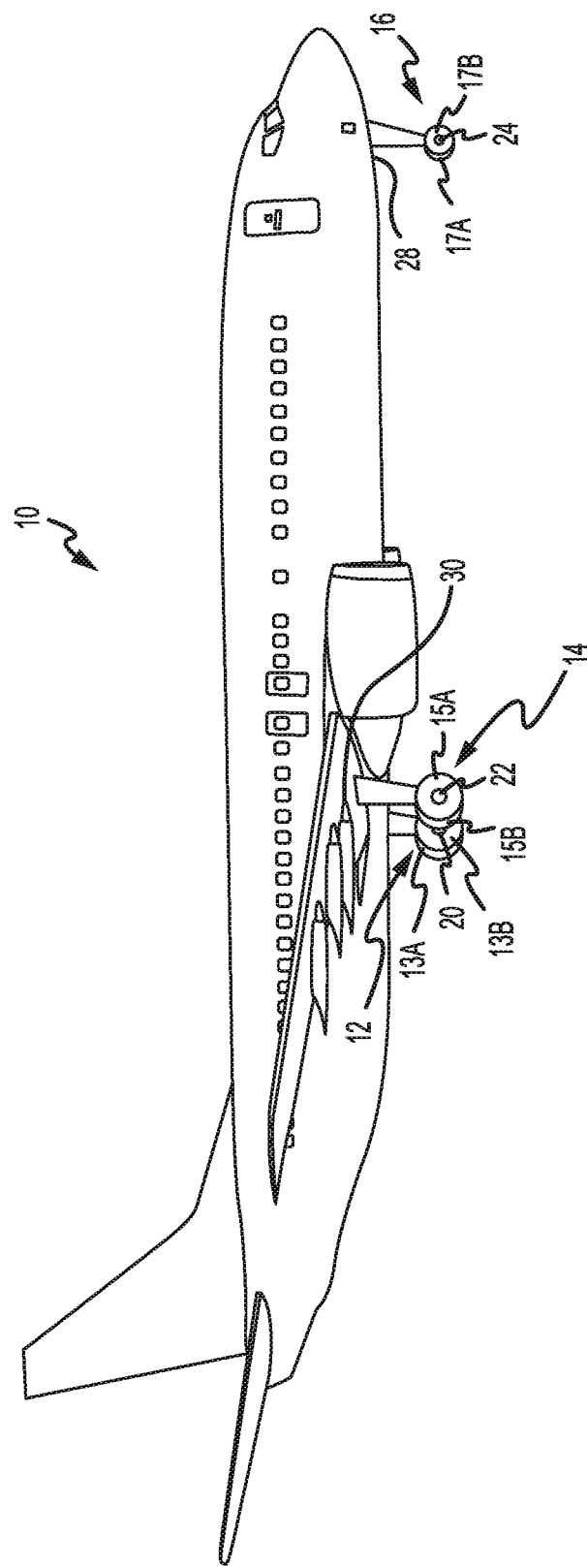
FIG. 1A illustrates an aircraft having a wheel and brake system comprising a multilayer piston insulator, in accordance with various embodiments.

Referring now to FIG. 1A, in accordance with various embodiments, an aircraft 10 includes landing gear, such as a left main landing gear 12, a right main landing gear 14, and nose landing gear 16. The left main landing gear 12, right main landing gear 14, and nose landing gear 16 typically support the aircraft 10 when the aircraft 10 is not flying, thereby allowing the aircraft 10 to taxi, take off, and land without damage. In various embodiments, the left main landing gear 12 includes a first wheel 13A and a second wheel 13B coupled by an axle 20. In various embodiments, the right main landing gear 14 includes a first wheel 15A and a second wheel 15B coupled by an axle 22. In various embodiments, the nose landing gear 16 includes a first nose wheel 17A and a second nose wheel 17B coupled by an axle 24. In various embodiments, the aircraft 10 comprises any number of landing gear(s), and each landing gear comprises any number of wheels. In various embodiments, the left main landing gear 12, right main landing gear 14, and nose landing gear 16 are retracted when the aircraft 10 is in flight. In various embodiments, one or more of the left main landing gear 12, right main landing gear 14, and nose landing gear 16 extends from an underside of a fuselage 28 of the aircraft 10, or from an underside of the wings 30 thereof.

Figure 1B:
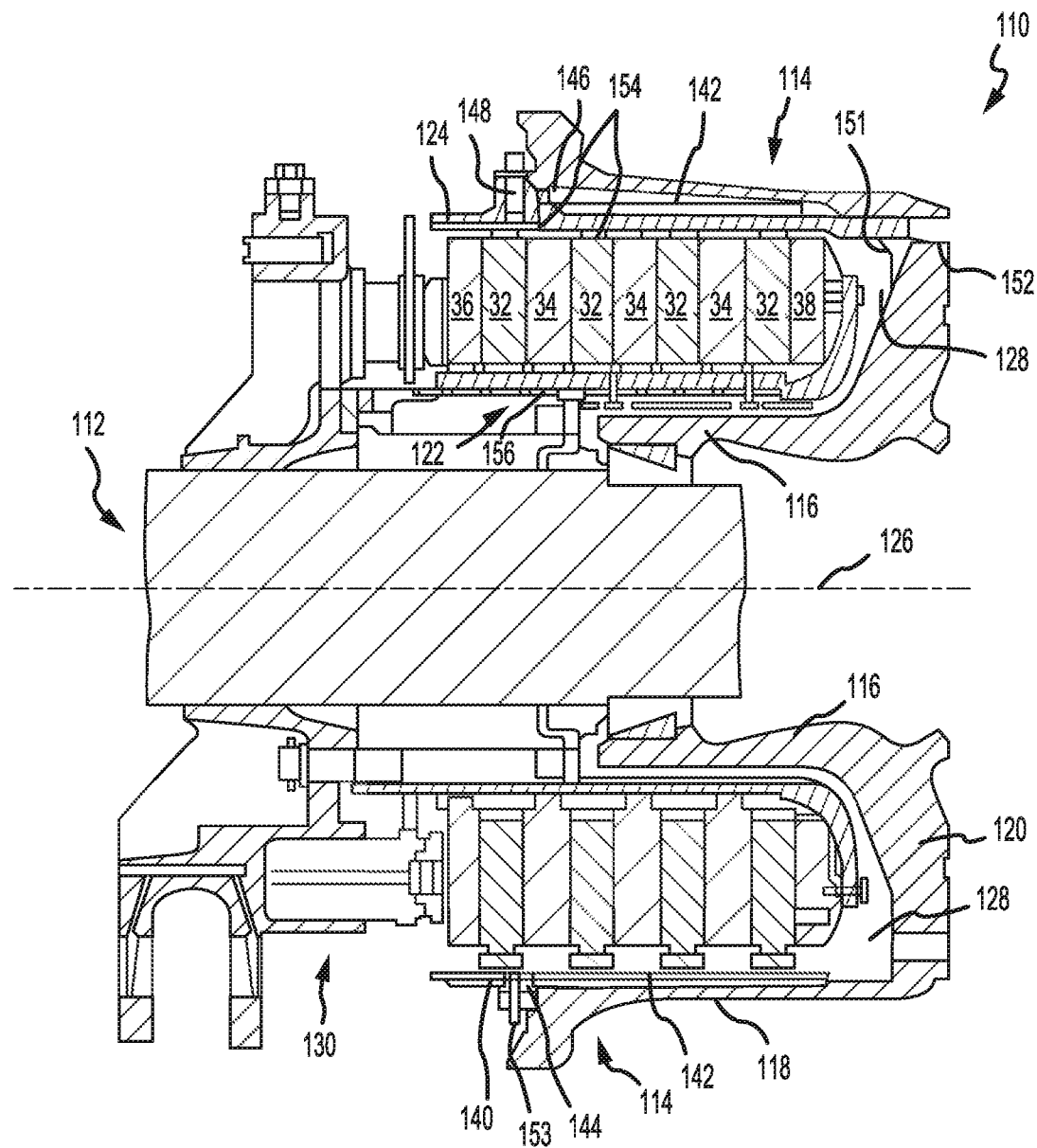
FIG. 1B illustrates a wheel and brake assembly for mounting on an axle comprising a multilayer piston insulator, in accordance with various embodiments.

In various embodiments, the aircraft 10 also includes a brake system that is applied to one or more of the wheels 13A, 13B, 15A, 15B, 17A, 17B of one or more of the respective left main landing gear 12, right main landing gear 14, and/or nose landing gear 16. Referring now to FIG. 1B, a wheel and brake assembly for mounting on an axle 110 comprising a multilayer piston insulator 200 is located on the aircraft 10 of FIG. 1-A, in accordance with various embodiments. The wheel and brake assembly for mounting on an axle 110 typically comprises a bogie axle 112, a wheel 114 (e.g., the wheels 13A, 13B, 15A, 15B, 17A, 17B of FIG. 1-A) including a hub 116 and wheel well 118, a web 120, a torque take-out assembly 122, one or more torque bars 124, a wheel rotational axis 126, a wheel well recess 128, an actuator assembly 130, multiple brake rotors 32, multiple brake stators 34, a pressure plate 36, an end plate 38, a heat shield 140 which may have sections 142, multiple heat shield carriers 144, an air gap 146, multiple torque bar bolts 148, a torque bar pin 151, a wheel web hole 152, multiple heat shield fasteners 153, multiple rotor lugs 154, and multiple stator slots 156.

Brake disks (e.g., the interleaved brake rotors 32 and brake stators 34) comprise a brake friction stack disposed in the wheel well recess 128 of the wheel well 118. The brake rotors 32 are typically engaged to the torque bars 124 for rotating with the wheel 114, while the brake stators 34 are typically engaged with the torque take-out assembly 122. At least one actuator assembly 130 is typically operable to compress the interleaved brake rotors 32 and brake stators 34 for stopping the aircraft 10 of FIG. 1A. In the embodiment of FIG. 1B, the actuator assembly 130 is shown as a comprising a hydraulically actuated piston. The pressure plate 36 and end plate 38 are disposed at opposite ends of the interleaved brake rotors 32 and brake stators 34.

Through compression of the brake rotors 32 and brake stators 34 between the pressure plate 36 and end plate 38, the resulting frictional contact slows, stops, and/or prevents rotation of the wheel 114. The torque take-out assembly 122 is typically secured to a stationary portion of a landing gear truck, such as a bogie beam or other landing gear strut, such that the torque take-out assembly 122 and brake stators 34 are prevented from rotating during braking of the aircraft 10 of FIG. 1A. The brake rotors 32 and brake stators 34 are typically fabricated from various materials, such as, for example carbon materials. The brake disks typically withstand and dissipate the heat generated from friction between the brake disks while braking the aircraft 10 of FIG. 1A. The frictional contact tends to heat the rotors and stators in excess of 1000° F. [538° C.].

Figure 2:
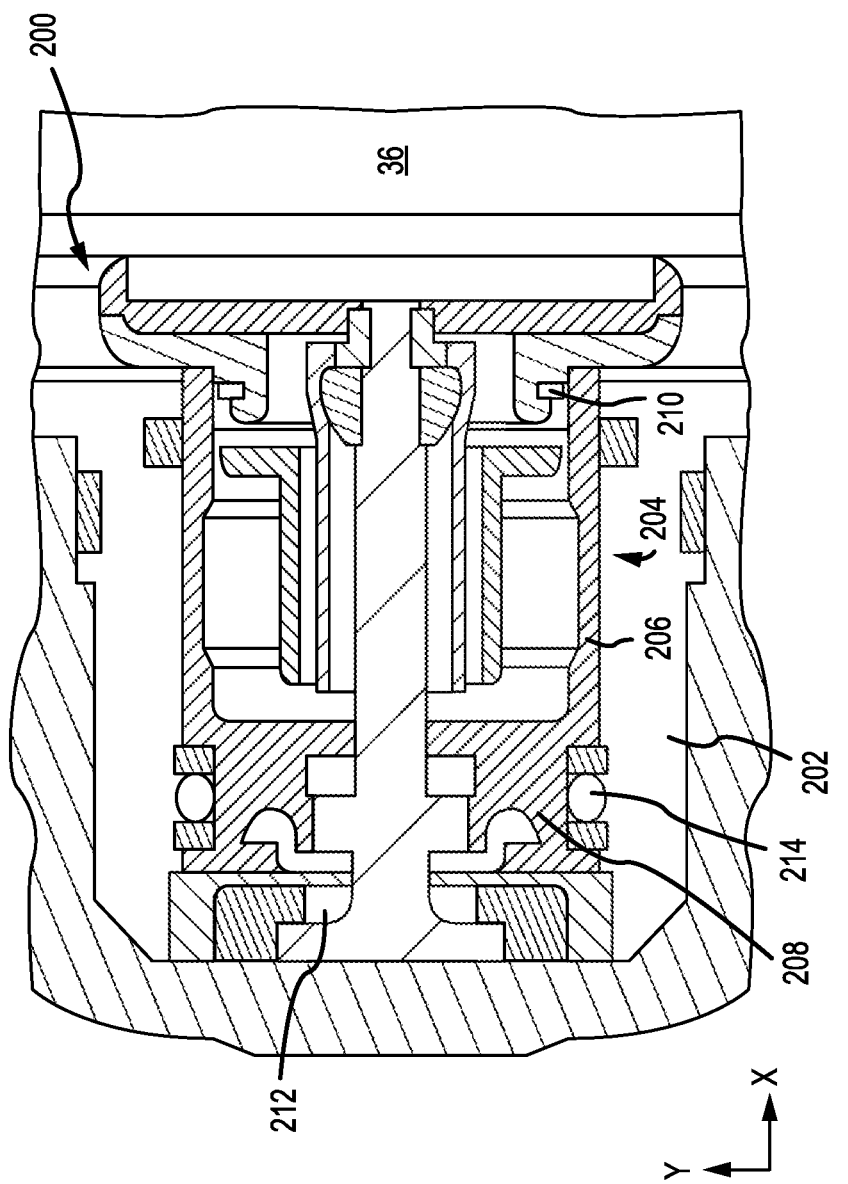
FIG. 2 illustrates an actuator assembly including a multilayer piston insulator, in accordance with various embodiments.

According to various embodiments and with reference to FIGS. 1 and 2, actuator assembly 130 is illustrated in cross section through the XY-plan and comprising the multilayer piston insulator 200. The actuator assembly 130 comprises a piston housing 202 and a piston 204 configured to translate axially (along the X-axis) within the piston housing 202 in response to hydraulic pressure. Piston 204 comprises an annular-cylindrical structure 206 extending from the piston base wall 208 toward the multilayer piston insulator 200. The multilayer piston insulator 200 is coupled to the annular-cylindrical structure 206 opposite the piston base wall 208 by a retaining ring 210. Hydraulic fluid enters cavity 212 behind piston base wall 208 and is retained by seal member 214. The hydraulic fluid exerts hydraulic pressure on the piston 204, causing the multilayer piston insulator 200 to contact the pressure plate 36 and exert brake pressure on the brake rotors 32 and brake stators 34. In response, the pressure plate 36 tends to undergo heating and the multilayer piston insulator 200 may tend to mitigate conductive heat transfer between the pressure plate 36 and the annular-cylindrical structure 206 of piston 204. In this regard, conductive heat transfer between the piston base wall 208 and the hydraulic fluid may be reduced.

Figure 3A:
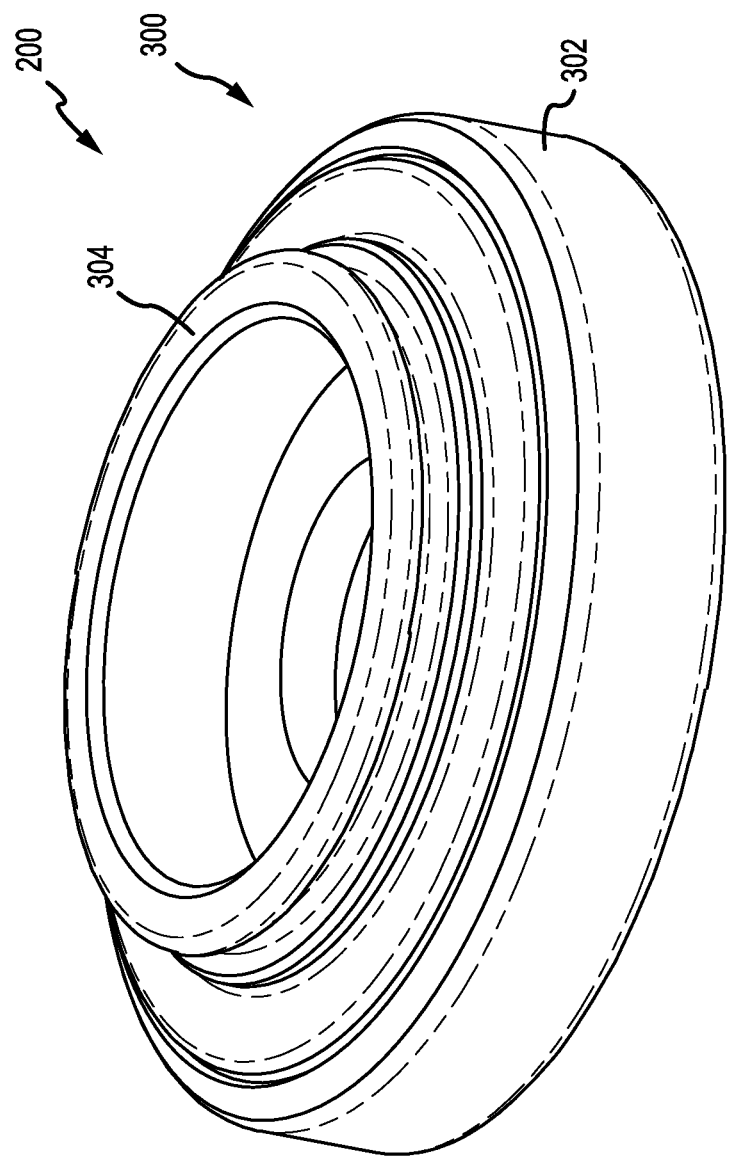
FIG. 3A illustrates a multilayer piston insulator, in accordance with various embodiments.
Figure 3B:
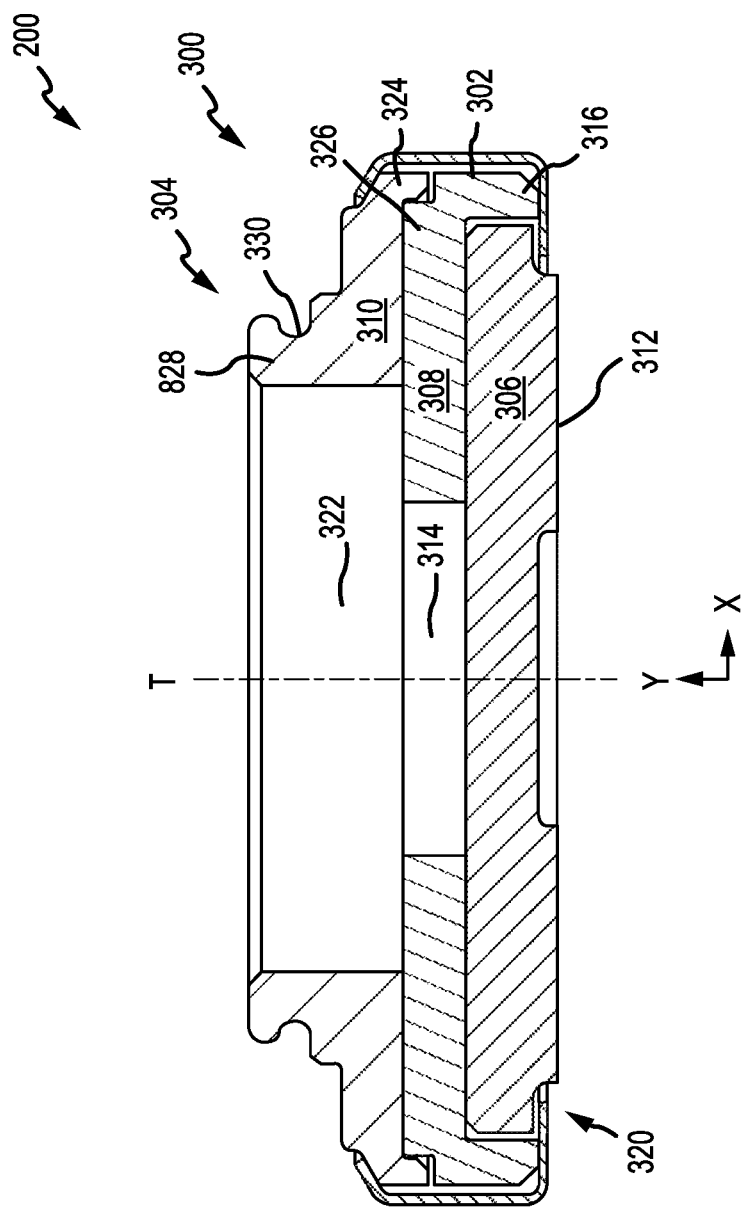
FIG. 3B illustrates a multilayer piston insulator, in accordance with various embodiments.

With reference now to FIGS. 3A and 3B, in various embodiments, a disk stack 300 of multilayer piston insulator 200 is illustrated in perspective (FIG. 3A) and in cross section through the XY-plane (FIG. 3B). Disk stack 300 comprises a plurality of axially aligned disks coupled about the circumference of the disk stack 300 by a retaining band 302. The disk stack 300 may comprise a coupling feature 304 configured to interface the disk stack 300 to the piston 204. In various embodiments, the disk stack 300 comprises a first disk 306, a second disk 308, and a third disk 310. The second disk 308 may be coupled relatively between the first disk 306 and the third disk 310. The first disk 306 may comprise a carbon material and include a raised contact ring 312 extending from a face of the first disk distal of the coupling feature 304.

In various embodiments the second disk 308 may comprise a first annulus 314 and a first circumferential wall 316. The second disk 308 may comprise a different material than the first disk. In various embodiments, the second disk 308 may comprise one of a steel, a stainless steel, a tungsten carbide, a titanium, a titanium alloy, a nickel, nickel alloy, a nickel steel (e.g., an austenitic nickel-chromium-based alloy such as that available under the trade name INCONEL), a silicate, or a ceramic. In various embodiments the first circumferential wall 316 extends perpendicular to the second disk proximate the outer diameter of the second disk. In this regard, the first circumferential wall 316 may define a disk cup 320 configured to retain the first disk 306. In various embodiments, the first disk 306 may be disposed within the disk cup 320 and, in response, axially aligned with the second disk 308.

In like regard, the third disk 310 may comprise a second annulus 322 and a second circumferential wall 324. The second circumferential wall 324 extends perpendicular to the third disk 310 proximate an outer diameter of the third disk 310. In various embodiments, the second disk 308 may comprise a coupling portion 326 configured to interface with the second circumferential wall 324. In this regard, the second circumferential wall 324 may be defined by the coupling portion 326. The second circumferential wall 324 may be configured to axially align the third disk 310 and the second disk 308 in response to coupling the third disk 310 at the coupling portion 326 of the second disk 308. In various embodiments, the first annulus 314 has a diameter relatively less than that of the second annulus 322. In various embodiments, an annular extrusion 328 may extend about second annulus 322 perpendicular to the third disk 310. The annular extrusion 328 may include a retaining ring channel 330 cut radially (along the X-axis) inward from an outer diameter of the annular extrusion 328. In various embodiments, the third disk 310 may comprise the low thermal conductivity material or any of a steel, a stainless steel, a tungsten carbide, a titanium, a titanium alloy, a nickel, nickel alloy, a nickel steel (e.g., an austenitic nickel-chromium-based alloy such as that available under the trade name INCONEL), a silicate, or a ceramic. In this regard, the disk stack 300 may be configured to inhibit conductive heat transfer between the first disk and the third disk by selection of disk materials having comparatively low coefficients of thermal conductivity.

Figure 4:
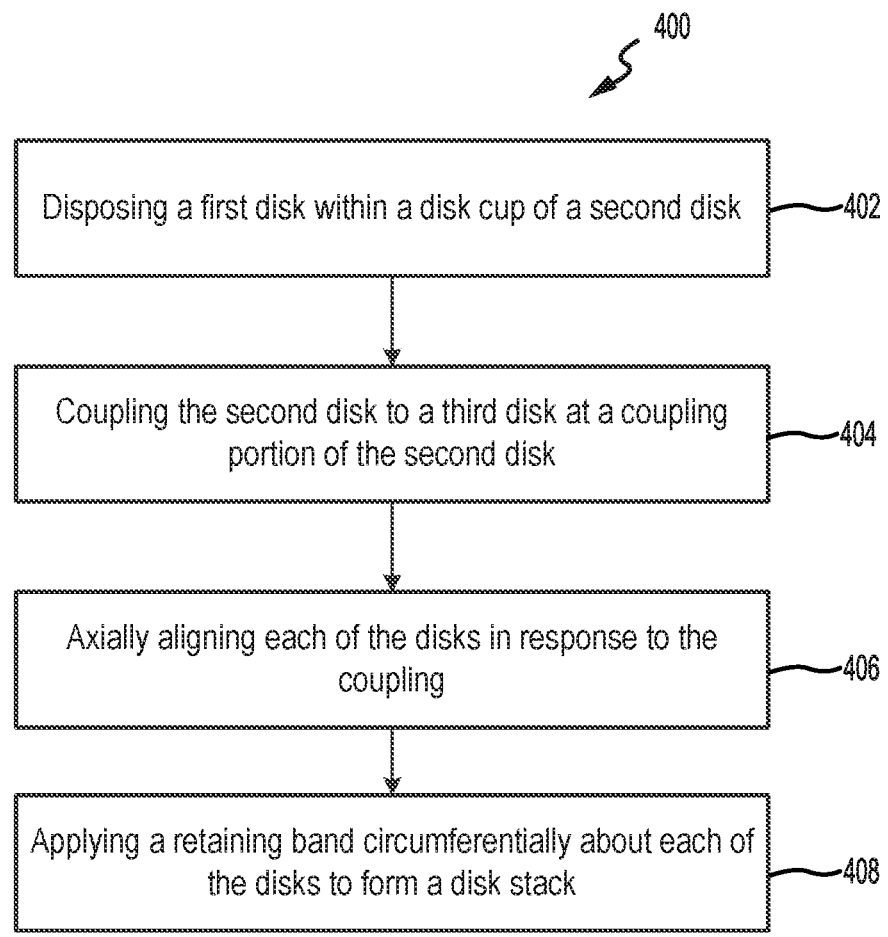
FIG. 4 illustrates a method of manufacturing a multilayer piston insulator, in accordance with various embodiments.

In various embodiments and with additional reference now to FIG. 4, a method 400 of manufacturing a multilayer piston insulator may comprise disposing first disk 306 within disk cup 320 of the second disk 308 (step 402). The first disk 306 may comprise a carbon material. Method 400 includes coupling the second disk 308 to the third disk 310 at the coupling portion 326 of the second disk 308 (step 404). Method 400 includes axially aligning (e.g., disk centers along the Y-axis) each of the first disk 306, the second disk 308, and the third disk 310 in response to the coupling (step 406). Method 400 includes applying the retaining band 302 circumferentially about each of first disk 306, the second disk 308, and the third disk 310 to form the disk stack 300 (step 408).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A multilayer piston insulator, comprising:
   a plurality of axially aligned disks of a disk stack comprising a first disk, a second disk, and a third disk,
   wherein the second disk is coupled coaxially between the first disk and the third disk and comprises a different material than the first disk and the third disk,
   wherein the second disk comprises a first circumferential wall extending perpendicular to the second disk proximate an outer diameter of the second disk defining a disk cup,
   wherein the first disk is disposed within the disk cup defined by the first circumferential wall,
   wherein the disk stack is configured to couple to a hydraulic piston, and wherein each of the plurality of axially aligned disks are coupled by a retaining band applied circumferentially about the disk stack.

2. The multilayer piston insulator of claim 1, wherein the first disk comprises a carbon material.

3. The multilayer piston insulator of claim 1, wherein at least one of the second disk or the third disk comprises one of a steel, a stainless steel, a tungsten carbide, a titanium, a titanium alloy, a nickel, nickel alloy, a nickel steel, a silicate, or a ceramic.

4. The multilayer piston insulator of claim 1, wherein the second disk comprises a first annulus and the third disk comprises a second annulus.

5. The multilayer piston insulator of claim 4, wherein the first annulus has a diameter relatively lesser than that of the second annulus.

6. The multilayer piston insulator of claim 4, wherein the third disk comprises an annular extrusion perpendicular to the third disk about the second annulus, wherein the annular extrusion comprises a retaining ring channel.

7. The multilayer piston insulator of claim 1, wherein the third disk comprises a second circumferential wall extending perpendicular to the third disk proximate an outer diameter of the third disk, wherein the second circumferential wall is defined by a coupling portion of the second disk.

8. A wheel and brake assembly for mounting on an axle, comprising:
    a brake friction stack;
    a wheel comprising a hub coupled to the axle;
    a torque bar configured to engage with the wheel and rotate the brake rotor; and
    an actuator assembly configured to apply brake pressure to the brake friction stack including a multilayer piston insulator, comprising:
    a plurality of axially aligned disks of a disk stack comprising, a first disk, a second disk, and a third disk,
    wherein the second disk is coupled coaxially between the first disk and the third disk and comprises a different material than the first disk and the third disk,
    wherein the second disk comprises a first circumferential wall extending perpendicular to the second disk proximate an outer diameter of the second disk defining a disk cup,
    wherein the first disk is disposed within the disk cup defined by the first circumferential wall,
    wherein the disk stack is configured to couple to a hydraulic piston, and
    wherein each of the plurality of axially aligned disks are coupled by a retaining band applied circumferentially about the disk stack.

9. The wheel and brake assembly of claim 8, wherein the first disk comprises a carbon material, and
    wherein at least one of the second disk or the third disk comprises one of a steel, a stainless steel, a tungsten carbide, a titanium, a titanium alloy, a nickel, nickel alloy, a nickel steel, a silicate, or a ceramic.

10. The wheel and brake assembly of claim 8, wherein the second disk comprises a first annulus and the third disk comprises a second annulus.

11. The wheel and brake assembly of claim 10, wherein the first annulus has a diameter relatively lesser than that of the second annulus.

12. The wheel and brake assembly of claim 10, wherein the third disk comprises an annular extrusion perpendicular to the third disk about the second annulus, wherein the annular extrusion comprises a retaining ring channel.

13. The wheel and brake assembly of claim 8, wherein the third disk comprises a second circumferential wall extending perpendicular to the third disk proximate an outer diameter of the third disk, wherein the second circumferential wall is defined by a coupling portion of the second disk.

14. A method of manufacturing a multilayer piston insulator, the method comprising:
    disposing a first disk of a carbon material within a disk cup of a second disk;
    coupling the second disk to a third disk at a coupling portion of the second disk;
    axially aligning each of the first disk, the second disk, and the third disk in response to the coupling; and
    applying a retaining band circumferentially about each of the first disk, the second disk, and the third disk to form a disk stack.

* * * * *